(12) United States Patent
Strait (10) Patent No.: US 8,675,753 B2
(45) Date of Patent: Mar. 18, 2014

(54) SYMBOL SYNCHRONIZATION FOR COMMUNICATION

(75) Inventor: Jeffrey C. Strait, Reno, NV (US)

(73) Assignee: Metanoia Technologies, Inc., Austin, TX (US)

(*) Notice: Subject to any disclaimer, the term of this patent is extended or adjusted under 35 U.S.C. 154(b) by 23 days.

(21) Appl. No.: 13/338,677

(22) Filed: Dec. 28, 2011

(65) Prior Publication Data

US 2012/0093252 A1 Apr. 19, 2012

Related U.S. Application Data (63) Continuation-in-part of application No. 10/978,336, filed on Nov. 1, 2004, now Pat. No. 8,184,755.

(51) Int. Cl.
*H04K 1/10* (2006.01)

(52) U.S. Cl.
USPC ........... 375/260; 375/354; 375/259; 375/359; 370/324; 714/707; 714/798

(58) Field of Classification Search
USPC .................. 375/260, 354, 259, 359; 370/324; 714/707, 798
See application file for complete search history.

(56) References Cited

U.S. PATENT DOCUMENTS

| | | | |
|---|---|---|---|
| 5,579,338 A | | 11/1996 | Kojima |
| 5,974,087 A | * | 10/1999 | Nowara ................. 375/226 |
| 6,438,186 B1 | * | 8/2002 | Strait ..................... 375/354 |
| 7,050,419 B2 | * | 5/2006 | Azenkot et al. ........... 370/347 |
| 2005/0276339 A1 | * | 12/2005 | Chow et al. ............... 375/260 |
| 2005/0276340 A1 | | 12/2005 | Chow et al. |
| 2006/0093050 A1 | | 5/2006 | Strait |

OTHER PUBLICATIONS

Final Office Action for U.S. Appl. No. 10/978,336, Jeff Strait, "Symbol Synchronization for Communication" 7 pages.
European Search Report mailed Aug. 16, 2013 for European patent application No. 12198541.0, a counterpart foreign application of U.S. Appl. No. 13/338,677, 4 pages.
Non-Final Office Action for U.S. Appl. No. 13/338,677, mailed on May 9, 2013, Jeffrey Strait, "Symbol Synchronization for Communication", 12 pages.
Non-Final Office Action for U.S. Appl. No. 10/978,336, Jeff Strait, "Symbol Synchronization for Communication" 9 pages, Aug. 3, 2012.

* cited by examiner

*Primary Examiner* — Leila Malek
(74) *Attorney, Agent, or Firm* — Lee & Hayes, PLLC

(57) ABSTRACT

A communication system and method is disclosed that performs symbol boundary synchronization by generating a symbol alignment estimate from a partial signal correlation; and then refining the symbol alignment estimate via a carrier phase calculation. To generate the symbol alignment estimate, two methods are disclosed. After an estimate is determined, an embodiment provides for refining the symbol alignment estimate via a carrier phase calculation by determining a carrier phase of two adjacent carriers, determining a phase error as directly proportional to an offset from the start of a symbol, determining a phase difference contribution due to a communication channel and device hardware, and counter-rotating the determined carrier phase by an angle of a constellation point at a transmitter.

17 Claims, 4 Drawing Sheets

- Determine the length of the cycle extension by: $L_{ce} = L_{cp} + L_{cs} - \beta$.
  410
- Use the known constellation points to Manage symbol alignment
  420
- Identify each symbol as the sum of a periodic known signal and a random signal
  430
- Characterize the cross-correlation of the channel output with the periodic component of the transmitted signal as the sum of two convolutions
  440
- Ignore any convolution cross-correlation between the two partial sequences if a convolution can be approximated as zero
  450
- Use remaining convolution as an estimate of an effective channel impulse response
  460

FIGURE 5

SYMBOL SYNCHRONIZATION FOR COMMUNICATION

RELATED APPLICATIONS

This application is a continuation-in-part of prior pending U.S. patent application Ser. No. 10/978,336, filed Nov. 1, 2004, which is herein incorporated by reference in its entirety. Any disclaimer that may have occurred during the prosecution of the above-referenced application(s) is hereby expressly rescinded, and reconsideration of all relevant art is respectfully requested.

TECHNICAL FIELD OF THE DISCLOSURE

This disclosure pertains to the field of multicarrier transceivers, and, more particularly, to a partial signal symbol synchronization for fast data rate communication systems such as VDSL.

BACKGROUND OF THE DISCLOSURE

There is a growing need among both individuals and enterprises for access to a commonly available, cost effective network that provides speedy, reliable service. The Internet serves as a good example of the increased demands that have been placed on data networks. At first, Internet access consisted of text only data transfers. Recently, with the popularity of the World Wide Web (WWW) and the construction of numerous sites with high quality content, coupled with the development of Internet browsers such as Mosaic, Netscape Navigator and Microsoft Internet Explorer, the use of graphics, audio, video and text has surged on the Internet. Although graphics, audio and video make for a much more interesting way to view information as opposed to plain text, bandwidth consumption is significantly higher. A simple background picture with accompanying text requires approximately ten times the bandwidth needed by text alone. Real-time audio and streaming video typically need even more bandwidth. Because of the increased requirement for bandwidth, activities such as browsing home pages or downloading graphics, audio and video files can take a frustratingly long period of time. As use of the Internet and online services continues to spread, so does the use of more complex applications, such as interactive video games, telecommuting, business to business communications and videoconferencing. These complex applications place severe strains on data networks because of the intensive bandwidth required to deliver data-rich transmissions. The lack of available bandwidth in data networks is the primary barrier preventing many applications from entering mainstream use. Just as processing power limited the effectiveness of early PCs, bandwidth constraints currently limit the capabilities of today's modem user.

Most computer modem users access data through the standard telephone network, known as plain old telephone service (POTS). Equipped with today's speediest modems, dial up modems on a POTS network can access data at a rate of 28.8, 33.6 or 56 Kbps. Dial up modem transmission rates have increased significantly over the last few years, but POTS throughput is ultimately limited to 64 Kbps. While this rate may be acceptable for some limited applications like e-mail, it is a serious bottleneck for more complex transactions, such as telecommuting, videoconferencing or full-motion video viewing. Another network delivery system is asymmetric digital subscriber line (ADSL). Offering a downstream capacity of 6 Mbps or more to the home, ADSL has the downstream capacity to handle the most complex data transfers, such as full motion video, as well as an upstream capacity of at least 500 Kbps. However, due to its limitation of downstream bandwidth capacity, it essentially is a single service platform. Also, since it has to overcome the challenge of reusing several thousand feet of twisted pair wiring, the electronics required at each end of the cable are complex, and therefore currently very expensive.

Hybrid fiber coax (HFC), a network solution offered by telephone and cable companies, is yet another option for delivering high bandwidth to consumers known in the art. However, HFC has limitations. HFC networks provide a downstream capacity of approximately 30 Mbps, which can be shared by up to 500 users. Upstream bandwidth is approximately 5 Mbps and also is shared. A disadvantage with HFC is that shared bandwidth and limited upstream capacity become serious bottlenecks when hundreds of users are sending and receiving data on the network, with service increasingly impaired as each user tries to access the network.

Fiber to the home (FTTH) is still prohibitively expensive in the marketplace. An alternative is a combination of fiber cables feeding neighborhood Optical Network Units (ONUs) and last leg premises connections by existing or new copper. This topology, which can be called fiber to the neighborhood (FTTN), encompasses fiber to the curb (FTTC) with short drops and fiber to the basement (FTTB), serving tall buildings with vertical drops.

One of the enabling technologies for FTTN is very high rate digital subscriber line (VDSL). The system transmits high-speed data over short reaches of twisted pair copper telephone lines, with a range of speeds depending upon actual line length.

The VDSL standard as provided by the ANSI T1E1.4 Technical Subcommittee, provides guidelines for the transmitter and receiver within the VDSL modem. Unlike ADSL, very high bit rate DSL (VDSL) is capable of providing speeds of 52 Mbps downstream and 16 Mbps upstream. ADSL is capable of 10 Mbps downstream and 800 Kbps upstream. Other standards beyond ADSL and VDSL are being considered by standards bodies. For example, VDSL2 is one such standard. VDSL standards employ discrete multi-tone modulation (DMT) as the modulation technology. The training sequences for VDSL and future DMT modems require partially blind receivers in that certain carriers may be used to transmit messages rather than being specified a priori. Therefore, receiver training methods must recognize this structure and be designed to operate in an optimal fashion in the presence of randomized signal components on some of the DMT carriers. For example, in the VDSL multicarrier standard an interleaved training signal is defined such that even numbered carriers carry fixed and predetermined bit patterns while odd numbered carriers carry message bits that must be considered random until such time that the receiver can accurately demodulate and decode the signal.

Receiver modules such as symbol synchronization, equalization, echo cancellation, and sample clock synchronization must be designed to adapt to unknown channel and impairment conditions while partially blinded. Timing recovery in the form of both symbol alignment and sample clock synchronization is typically the first step in receiver training. What is needed is an efficient method for symbol alignment in a DMT receiver for any incoming DMT symbol train.

SUMMARY OF THE INVENTION

A communication system and method is disclosed that performs symbol boundary synchronization by generating a symbol alignment estimate from a partial signal correlation;

and then refining the symbol alignment estimate via a carrier phase calculation. To generate the symbol alignment estimate, two methods are disclosed. A first method generates the estimate by measuring an average pilot carrier over a block of symbols using a single carrier to monitor a signal to noise ratio (SNR), determining a noise measurement using the average pilot carrier over the block of symbols, indexing a symbol starting point, and performing an indexed search until the search covers a full discrete multi-tone (DMT) symbol.

The noise measurement may be a minimum noise variance value that is maintained throughout the indexed search and used as a coarse symbol alignment point after the search covers the full DMT symbol.

The search can include selecting a pilot tone and an indexing offset value such that the index spans an integer number of pilot tone periods to enable a sample timing recovery system to maintain a constant phase reference as an assumed symbol alignment point is hopped through the search range.

According to an alternate embodiment, the generating the symbol alignment estimate can include receiving a training signal, determining the length of the cycle extension, using known constellation points to manage symbol alignment, identifying each symbol as the sum of a periodic known signal and a random signal, characterizing the cross-correlation of the channel output with the periodic component of the transmitted signal as the sum of a first convolution and a second convolution, ignoring the first convolution, the first convolution being a cross-correlation between two partial sequences, because the first convolution can be approximated as zero, and using the second convolution as an estimate of the effective channel impulse response.

After an estimate is determined according to either method, an embodiment provides for refining the symbol alignment estimate via a carrier phase calculation by determining a carrier phase of two adjacent carriers, determining a phase error as directly proportional to an offset from the start of a symbol, determining a phase difference contribution due to a communication channel and device hardware, and counter-rotating the determined carrier phase by an angle of a constellation point at a transmitter.

BRIEF DESCRIPTION OF THE DRAWINGS

For a more complete understanding of the present disclosure, and the advantages thereof, reference is now made to the following brief descriptions taken in conjunction with the accompanying drawings, in which like reference numerals indicate like features.

DETAILED DESCRIPTION

In the following description, for purposes of explanation and not limitation, specific details are set fourth, such as particular hardware, applications, techniques, etc. In order to provide a thorough understanding of the present invention. However, it will be apparent to one skilled in the art that the present invention may be practiced in other embodiments that depart from these specific details. In other instances, detailed descriptions of well-known methods, protocols, devices, and circuits are omitted so as not to obscure the description of the present invention with unnecessary details.

Figure 1:
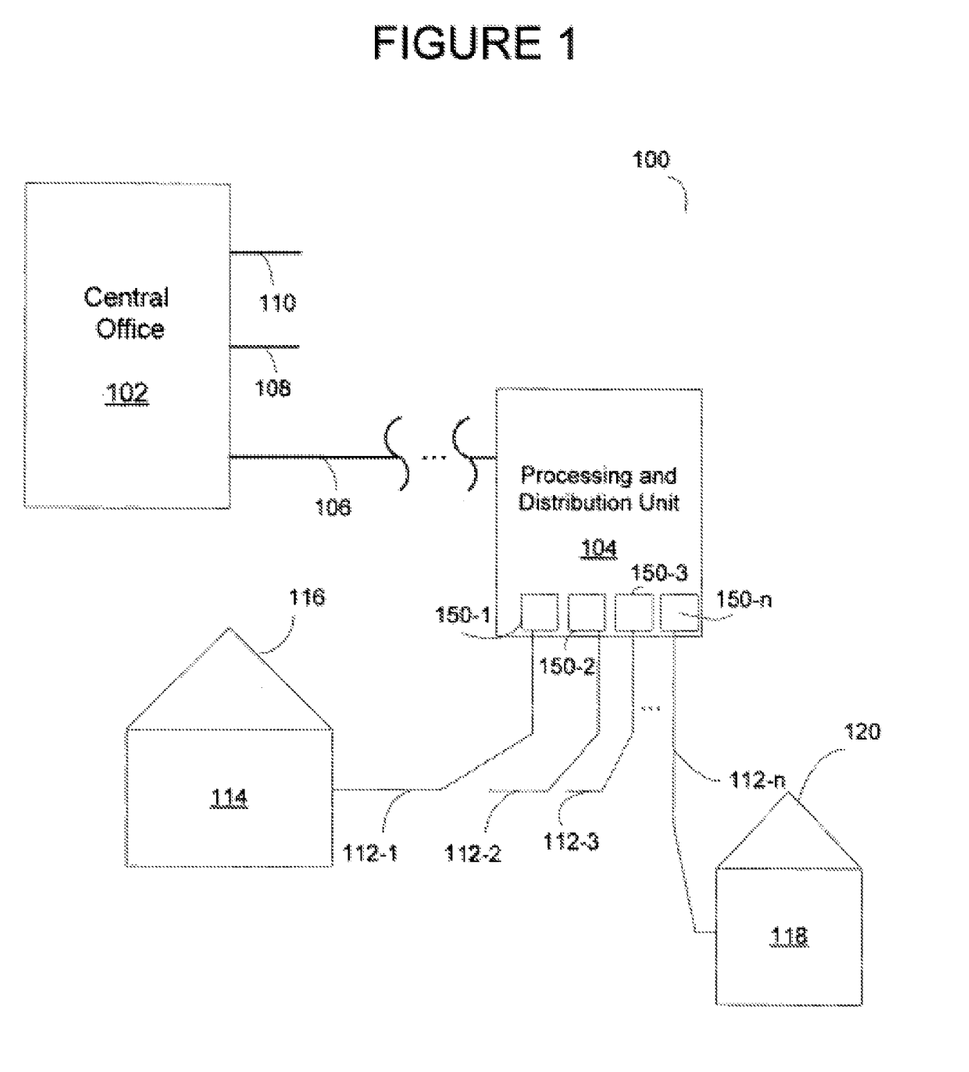
FIG. 1 is a block diagram showing a digital subscriber line system appropriate for implementing embodiments of the present invention.

With reference to FIG. 1, a block diagram illustrates an exemplary DMT-based communications network 100 suitable for implementing the invention. A central office (CO) 102 serves a plurality of distribution posts, such as processing and distribution unit 104, to provide data transmission to/from central office 102 from/to various remote units. Central office 102 and processing and distribution unit 104 are interconnected by a high-speed multiplexed transmission line 106, e.g. a fiber optic line in which case processing and distribution unit 104 typically is referred to as an optical network unit (ONU). Lines 108 and 110 indicate that central office 102 may as well be connected to other processing and distribution units.

Processing and distribution unit 104 includes digital DMT-based transceivers, for example, modems 150-1 through 150-$n$. Processing and distribution unit 104 serves a plurality of discrete subscriber lines 112-1 to 112-$n$, each of which typically serves a single end user. Specifically, first 116 and second 120 end users have remote units 114, 118, respectively, suitable for duplex or full duplex communication with processing and distribution unit 104 at high bit rates. Remote units 114 and 118 may be incorporated in a variety of devices such as for instance telephones, televisions, monitors, computers etc. It should be noted that several remote units may be connected to a single subscriber line.

Modems 150 operate using orthogonal frequency division multiplexed carriers (OFDM carriers) for discrete multi-tone (DMT) transmissions. Modems 150 load according to each carrier's capacity determined during initial training and analysis periods.

Proper symbol boundary synchronization in modems 150 is critical for optimum performance of DMT modulation. Improper symbol alignment causes performance deterioration through poor equalizer alignment and convergence, thereby increasing inter-symbol interference (ISI). If the symbol alignment error exceeds the length of equalizer support, training will be suboptimal or fail. It has been discovered that to maintain equalizer performance at a specific level, the support of the equalizer filter should be increased by the uncertainty of the offset estimate.

Figure 2:
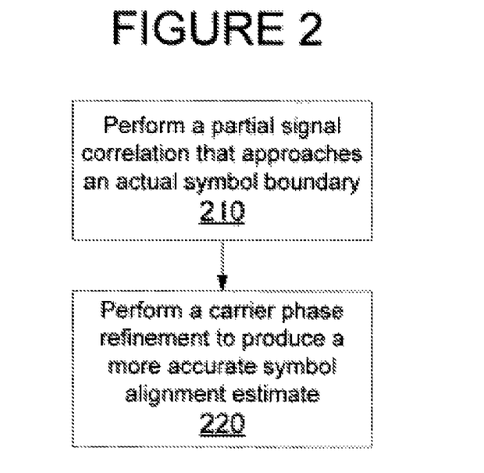
FIG. 2 is a flow diagram illustrating a method in accordance with an embodiment of the present invention.

Referring now to FIG. 2, a flow diagram illustrates a method for synchronization using a training signal. The method is designed for the VDSL multicarrier standard developed by T1E1.4, described above. The training signal, for example, is a DMT signal with cyclic prefix which consists of fixed and predetermined constellation points on even numbered carriers with a priori unknown message bits modulating the odd numbered carriers with the exception of carriers with indices 10m+9, with m being an integer.

Block 210 provides for performing a partial signal correlation that approaches an actual symbol boundary. The partial signal correlation reduces ISI. After performing a partial signal correlation, block 220 provides for performing a carrier phase refinement to produce a more accurate symbol alignment estimate, thereby minimizing ISI.

Block 220 can be implemented as a refining of the first symbol boundary estimate using, for example, the phase error between two adjacent carriers from an index set {10m+8, 10m+9, 11m; integer m}.

According to an embodiment, block 210 can be accomplished by one of at least two methods. A first method is illustrated in a flow diagram in FIG. 3.

Figure 3:
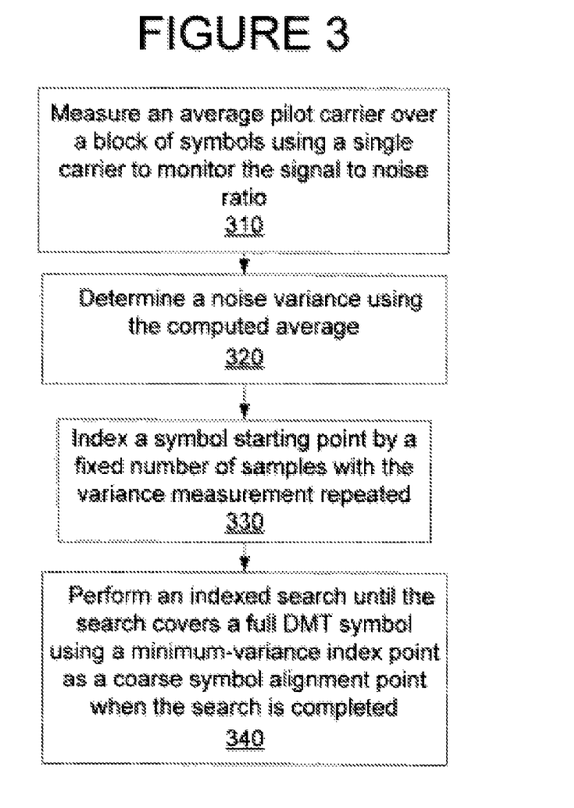
FIG. 3 is a flow diagram illustrating a method for performing a partial signal correlation that approaches an actual symbol boundary in accordance with an embodiment of the present invention.

Specifically, FIG. 3 illustrates a method for performing an exhaustive search implemented by beginning at an arbitrary initial symbol starting point within a receiver's time domain signal buffer. The method provides for measuring the noise variance on a selected carrier or group of carriers over a block of symbols. In an embodiment, the noise variance is the accumulated constellation error measured by first finding the average constellation over a block of symbols, then calculating the error for each symbol as the difference of the average constellation minus the constellation associated with the selected current carrier.

As an example, the receiver may orthogonalize the received symbol to produce an output which consists of an output point for each of N carriers. This output point, per tone, is characterized as a complex number in a complex plane, that represents both the amplitude and phase of a respective carrier with its associated data. Stated another way, the output of a Fourier-related transform (e.g., Discrete Fourier Transform (DFT) and/or Fast Fourier Transform (FFT)) may be categorized as an output point or complex number that represents a complex frequency domain channel output point, where the output of each of the N orthogonal frequency domain channels at the output of, for example, a DFT/FFT, are complex constellation points. The complex constellation point at, for example, the pilot carrier frequency, may be averaged as a complex number, or alternatively averaged in both magnitude and phase, in order to provide an average reference signal used in the calculation of constellation errors as well as a calculation of SNR.

Therefore, averaging a particular carrier refers to averaging this complex number over a number of symbols to compute an average complex value. This computed average may then be used as a reference to calculate a complex error associated with the complex number of each symbol at the specified carrier index. As an example, a difference between the computed average (e.g., the average complex value) and the complex number associated with each symbol at the specified carrier index may be used. In an embodiment, the error power is used because it is equal to the real component squared plus the imaginary component squared of the complex error.

Block 310 provides for measuring an average pilot carrier over the block of symbols using a single carrier to monitor the signal to noise ratio. As an example, the signal to noise ratio may be measured as a ratio of the signal power of a pilot carrier and the error power, as described above. As another example, the signal to noise ratio (SNR) may be based in part on a ratio of a complex number associated with a pilot carrier and a complex error measured over a block of symbols associated with a selected carrier or group of carriers. A Euclidean norm of the complex numbers may be used to determine the SNR. It should be noted that a maximum SNR may be associated with a minimum symbol alignment error, as the signal power is generally unchanged over the accumulation interval. Therefore, the point at which SNR is maximized, or equivalently the error is minimized, may provide a best location of an actual symbol boundary estimate.

Block 320 provides for determining a noise measurement (the noise variance) using the computed average. As an example, the noise measurement may be determined based in part on determining a complex error associated with the average constellation measured over a block of symbols and a constellation associated with at least one carrier.

Block 330 provides for indexing a symbol starting point, the indexing by a fixed number of samples with the noise variance measurement repeated. Block 340 provides for performing an indexed search until the search covers a full DMT symbol. The minimum noise variance value is maintained throughout the search along with the associated index value. The minimum-variance index point is then used as the coarse symbol alignment point when the search is completed.

In an embodiment, a symbol alignment assumption is adjusted and a new noise variance is then measured at the adjusted symbol alignment assumption. The new noise variance is compared to a previously recorded minimum noise variance value. If the new noise variance is lower than the previously recorded minimum noise variance, a new best alignment estimate is set to the current value, along with the new minimum noise variance. The search continues to find a better alignment solution associated, for example, with an overall minimum noise variance. The minimum-variance index point is then used as the coarse symbol alignment point when the search is completed. Alternately, a search that maximizes SNR could be performed to find the best alignment estimate.

In an embodiment, the method described with reference to FIG. 3 uses a VDSL training signal that carries message data on approximately half of the active carriers. The VDSL training signal combined with the presence of a cyclic extension results in symbol boundary discontinuities as the data changes from symbol to symbol. The symbol discontinuities cause intersymbol interference (ISI) that have been discovered to correlate to the symbol alignment error.

Typically, a VDSL symbol structure consists of 4096 carriers with interleaved upstream and downstream passbands. A block of carriers at the high end of the 4096 available carriers is usually kept vacant to allow for an anti-aliasing guard band and to help satisfy the out-of-band Power Spectral Density (PSD) mask above the Nyquist frequency. The symbol rate is 4 kHz and a cyclic extension with typical length of 640 samples is inserted to give a sampling rate of (8192+640) 4000=35.328 MHz.

For the search, an embodiment provides that a pilot tone is selected and an indexing offset value is selected such that the index spans an integer number of pilot tone periods. Thus, a sample timing recovery system can maintain a constant phase reference as the assumed symbol alignment point is hopped through the search range.

In an embodiment, the search uses features of the carriers that enable simplified calculations. For example, the first downstream passband includes carriers 32 through 869. Bin 64 has a sample period of 8192/64=128. Therefore, using bin 64 with an index value of 128 samples for a coarse search gives a symbol alignment resolution of 128. In the upstream channel, bin 1024 has a sinusoidal period of eight samples. The index can be any multiple of eight, including 128. Using a lower multiple of eight improves the resolution of the result. However, a timing recovery procedure is usually used only at the customer premise equipment because the central office modem 150 operates using a fixed sampling frequency. Thus, a symbol alignment search would not be subject to the index constraint mentioned above.

Figure 4:
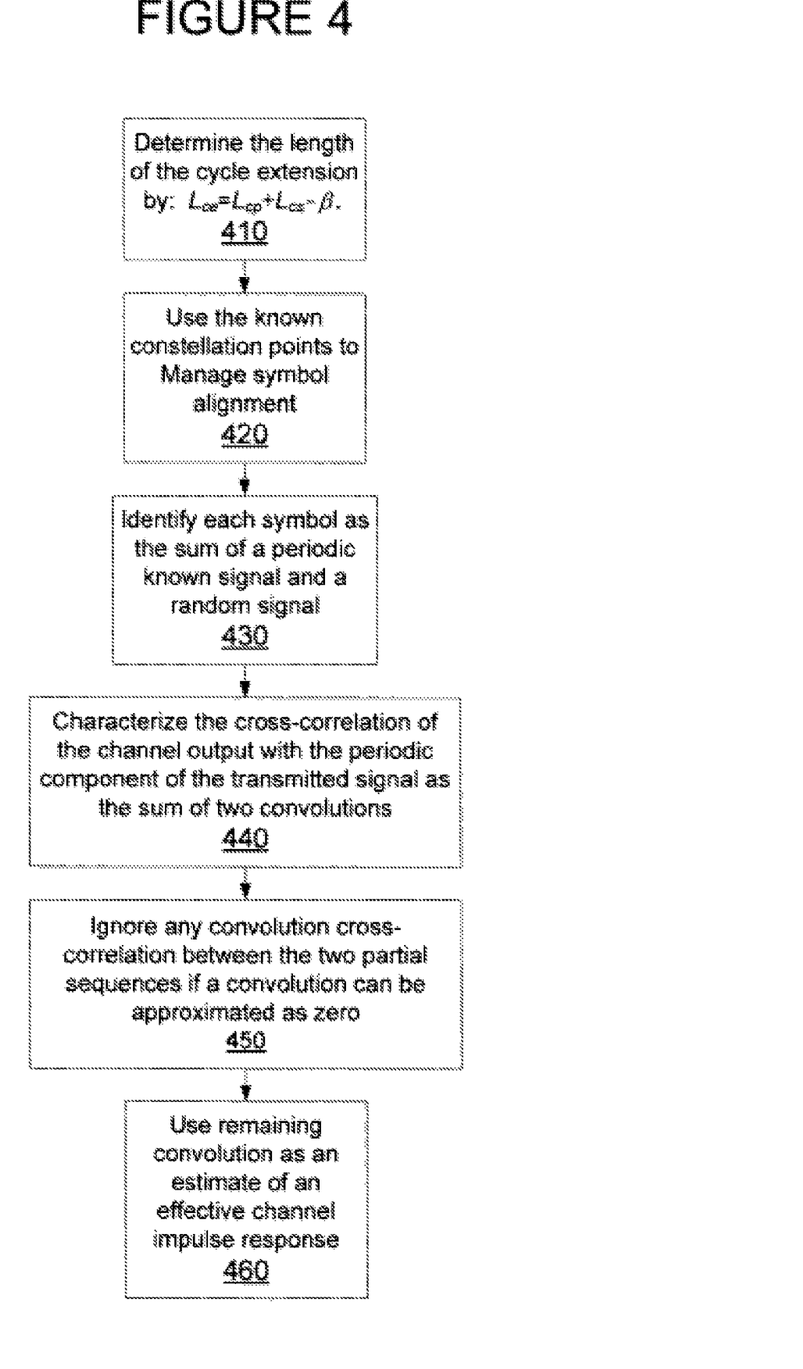
FIG. 4 is a flow diagram illustrating an alternative method for performing a partial signal correlation that approaches an actual symbol boundary in accordance with an embodiment of the present invention.

Referring now to FIG. 4, a flow diagram illustrates a second method for performing a partial signal correlation that approaches an actual symbol boundary. The second method uses features of the VDSL DMT signal and features of the known constellation points to manage symbol alignment. Specifically, the VDSL DMT signal structure is defined by a profile index n={0, 1, 2, 3, 4} which specifies the number of subcarriers $N_{sc}$={256, 512, 1024, 2048, 4096} and the length of the cyclic extension $L_{ce}$={40, 80, 160, 320, 640}. The symbol frequency is 4 kHz. Thus, the Nyquist sampling rate is $[2N_{sc}(n)+L_{ce}(n)]*4000$ samples/sec.

The method shown in FIG. 4 uses The cyclic extension includes a cyclic prefix (length $L_{cp}$) and a cyclic suffix (length $L_{cs}$), with an arbitrary overlap region there between, herein referred to as β. Thus, block 410 provides for determining the length of the cycle extension by: $L_{ce}=L_{cp}+L_{cs}-\beta$. In the time domain, the DMT time domain symbol is defined as:

$$x(k) = \sum_{i=0}^{2N_{sc}-1} Z'(i) e^{+j\frac{\pi k i}{2N_{sc}}} \qquad \text{Eqn. 1}$$

$$k = 0, \ldots, 2N_{sc}-1$$

where $$Z'(i) = \begin{cases} Z(i) & i = 0, \ldots, N_{sc}-1 \\ conj(Z(2N_{sc}-i)) & i = N_{sc}, \ldots, 2N_{sc}-1 \end{cases} \qquad \text{Eqn. 2}$$

The training signal is such that all allowable tones are modulated in 4 QAM (two-bit constellation, quadrature amplitude modulation) with the bit mapping defined in the following table:

TABLE 1

| Tone Index | Constellation Point |
| --- | --- |
| Even | 00 |
| 1, 11, 21, . . . , 10m + 1 | Message bits 0, 1 |
| 3, 13, 23, . . . , 10m + 3 | Message bits 2, 3 |
| 5, 15, 25, . . . , 10m + 5 | Message bits 4, 5 |
| 7, 17, 27, . . . , 10m + 7 | Message bits 6, 7 |
| 9, 19, 29, . . . , 10m + 9 | 00 |

The constellation points are pseudo-randomly rotated by 0, π/2, π, or 3 π/2, depending on the value of a 2-bit pseudo-random number d(2n), d(2n+1) wherein the bit generator is defined by $$d(n)=d(n-9)\oplus(n-11) \qquad \text{Eqn. 3}$$

The scrambler that creates the pseudo-random number is reset at the start of every symbol during training. The training messages can consist of several bytes.

Block 420 provides for using the known constellation points (defined above) to manage symbol alignment. Block 430 provides for identifying each symbol as the sum of a periodic known signal and a random signal as $$x(k)=x_p(k)+x_r(k) \qquad \text{Eqn. 4}$$

where $x_p(k)$ is the signal with all odd carrier sub-symbols (excluding 10m+9) set to zero, and $x_r(k)$ is the signal with all even sub-symbols (including 10m+9) set to zero. The channel output is the convolution of the impulse response with the transmitted signal:

$$y(k)=h(k)*x(k)=h(k)*[x_p(k)+x_r(k)] \qquad \text{Eqn. 5}$$

The cross-correlation of the channel output with the periodic component of the transmit signal is:

$$r_{y,x_p}(n_1, n_2) = E\{y(n_1)x_p(n_2)\} = E\left\{\sum_{l=0}^{M} h(l)x(n_1-l)x_p(n_2)\right\} \qquad \text{Eqn. 6}$$

$$= \sum_{l=0}^{M} h(l)E\{x(n_1-l)x_p(n_2)\} = \qquad \text{Eqn. 7}$$

$$\sum_{l=0}^{M} h(l)E\{[x_p(n_1-l)+x_r(n_1-l)]x_p(n_2)\}$$

$$= \sum_{l=0}^{M} h(l)[r_{p,r}(n_1-n_2-l)+r_{p,p}(n_1-n_2-l)] = h*r_{p,r} = h*r_{p,p} \qquad \text{Eqn. 8}$$

Block 440 and equations 6-8 provide for characterizing the cross-correlation of the channel output with the periodic component of the transmitted signal as the sum of two convolutions, one convolution between the channel impulse response and the cross-correlation between the signal with odd carrier sub-symbols set to zero and the signal with the even carrier sub-symbols set to zero; and one convolution between the channel impulse response and the autocorrelation of the signal with the odd carrier sub-symbols set to zero. Block 450 provides for ignoring the first convolution cross-correlation between the two partial sequences because the first convolution can be approximated as zero. The second convolution includes an autocorrelation sequence of the periodic signal that is approximately a delta function. Thus, block 460 provides for using the second convolution as an estimate of the effective channel impulse response. To determine the start of the impulse response, further analysis can be provided. The start of an impulse response refers to the initial point where impulse response energy becomes visible on a plot of the transmission path impulse response. The correlation method refers to the technique of obtaining an estimate of the channel impulse response by calculating the cross correlation of the transmitter and receiver signals. The delay between the start of the result of the correlation and the point where the impulse response is observable is used as the offset required to move a receiver FIFO pointer such that the modem will have discovered the first sample in subsequent DMT symbols. The result provides an initialization point for a carrier phase derived symbol alignment applicable to line-spectra DMT training sequences.

Figure 5:
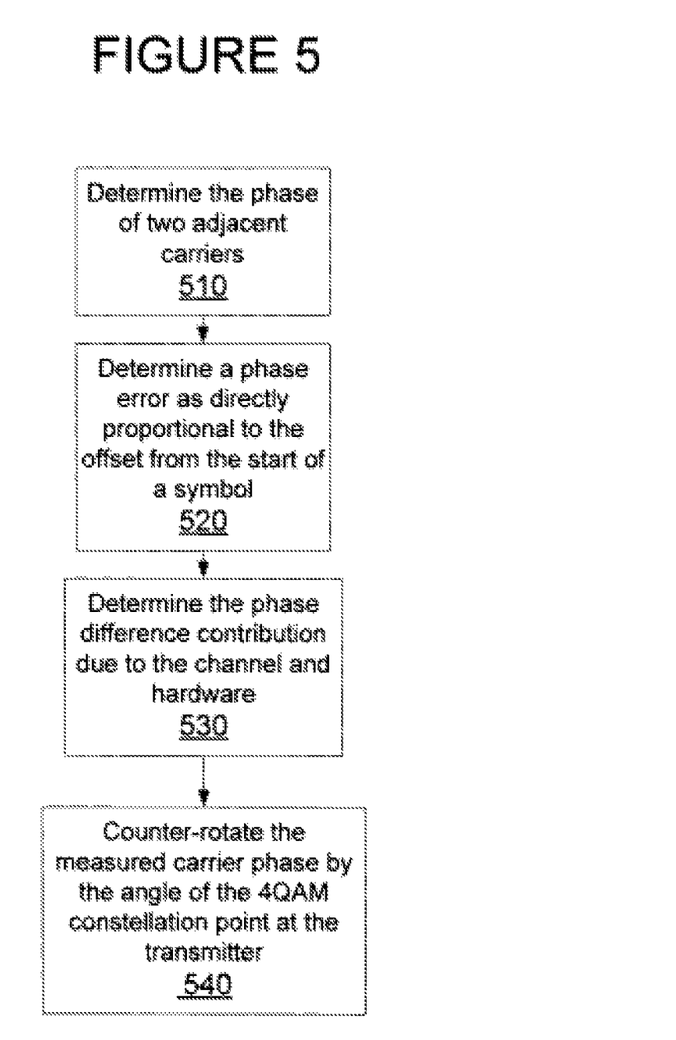
FIG. 5 is a flow diagram illustrating a method for performing a carrier phase refining to produce an accurate symbol alignment estimate in accordance with an embodiment of the present invention.

Block 220 refers to performing a refining for synchronization by performing a carrier phase refinement to produce a more accurate symbol alignment estimate. Referring to FIG. 5, a flow diagram illustrates how a refinement is achieved according to an embodiment.

Block 510 provides for determining the phase of two adjacent carriers. For example, the phase can be determined from the set {10m+8, 10m+9, 11m; integer m}. Block 520 provides for determining a phase error as directly proportional to the offset from the start of a symbol. More particularly, the phase difference between two adjacent DMT carriers varies linearly between 0 and 2π as the offset varies from 0 to 1 full symbol length. Block 530 provides for determining the phase difference contribution due to the channel and hardware, which can be assumed nearly constant over the channels of interest. Block 540 provides for counter-rotating the measured carrier phase by the angle {π/4, 3π/4, 5π/4, 7π/4} of a 4QAM constellation point at the transmitter. In an embodiment, counter-rotating the measured carrier phase provides for a more precise symbol alignment offset estimate by accounting for phase distortion that may be caused by the data.

Carriers at frequencies $f_1=p*f_0$ and $f_2=(p+1)*f_0=f_1+f_0$, where $f_0$ is the DMT fundamental (first carrier), can be used to generate the phase measurements. If the constant offset resulting from the constant phase difference due to the channel and hardware phase response is $k_c$, then an expression for the offset estimate δ follows as $$\delta = (N\Delta\phi_{offset}/(2\pi)) - k_c \quad \text{Eqn. 9}$$

where N is the symbol length and $\Delta\phi_{offset}$ is the compensated phase error given by:

$$\Delta\phi_{offset} = \Delta\phi_{offset1} - \Delta\phi_{offset2} = (\phi_1 - \phi_{data1}) - (\phi_2 - \phi_{data2}) \quad \text{Eqn. 10}$$

where $\Delta\phi_{offset1}$ and $\Delta\phi_{offset2}$ are the phase angles of carriers at frequencies $f_1$ and $f_2$, respectively, which have been compensated to remove the phase contribution of the data used to modulate each respective carrier. $\phi_1$ and $\phi_2$ refer to measured phase angles of the two adjacent carriers at frequencies $f_1$ and $f_2$, respectively, which include the phase of the modulating data symbols. As an example, $\Delta\phi_{offset1} = \phi_1 - \phi_{data1}$) and $\Delta\phi_{offset2} = (\phi_2 - \phi_{data2})$.

The constellation counter-rotations are represented above as $\phi_{data1}$ and $\phi_{data2}$ (i.e., the phase of the modulating data symbols at the transmitter, which serve to rotate the phase of the associated unmodulated carrier tones.) As an example, the phase of the data may be used to counter-rotate the carriers, thereby reducing or eliminating the influence of the data on the phase error between two adjacent carriers. Use of the constellation counter-rotations, as shown above in Eqn. 10, facilitates calculation of a new symbol alignment estimate that is more precise. The channel and hardware phase response $k_c$ can be determined empirically or calculated from $k_c = (N\Delta\phi_{channel})/(2\pi)$, where $\Delta\phi_{channel}$ is the phase difference between carriers $f_1$ and $f_2$. For example, averaging the measured phase angles over several symbols minimizes the already small effects of ISI on the fine displacement estimate.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing embodiments of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for performing symbol boundary synchronization by a communication system, the method comprising:
   generating, by the communication system, a symbol alignment estimate from a search for a minimum inter-symbol interference (ISI), wherein generating the symbol alignment estimate includes:
      measuring Discrete Fourier Transform domain complex constellation points over a block of symbols for a first carrier;
      computing an average of the complex constellation points over the block of symbols for the first carrier;
      for each symbol of the block of symbols, accumulating a Euclidean distance between the average of the complex constellation points and complex constellation points for at least one of the first carrier or one or more other selected carriers; and
      determining a noise measurement based on the accumulated Euclidean distance.

2. The method of claim 1 wherein generating the symbol alignment estimate further includes:
   indexing a symbol starting point; and
   the search includes performing an indexed search that covers a full discrete multi-tone (DMT) symbol, wherein the symbol alignment estimate is based at least in part on a value of the noise measurement observed over the search.

3. The method of claim 1 further comprising monitoring a signal to noise ratio (SNR) during the search, wherein the SNR is based at least in part on a ratio of the average of the complex constellation points and the noise measurement, wherein the noise measurement includes a minimum noise variance value that corresponds to a maximum SNR that is used as the symbol alignment estimate that minimizes the ISI.

4. The method of claim 2 wherein the noise measurement is a minimum noise variance value that is used as a coarse symbol alignment point after the search covers the full DMT symbol.

5. The method of claim 2 wherein the noise measurement correlates symbol discontinuities that cause intersymbol interference (ISI) with a symbol alignment error.

6. The method of claim 2 wherein the search includes selecting a pilot tone and an indexing offset value such that the index spans an integer number of pilot tone periods to enable a sample timing recovery system to maintain a constant phase reference as an assumed symbol alignment point is hopped through a range of the search.

7. The method of claim 2 wherein the search uses features of carriers that enable simplified calculations.

8. The method of claim 7 wherein a bin value is chosen to enable a symbol alignment resolution that is a power of two.

9. The method of claim 7 wherein for an upstream channel, an index value is chosen that is any multiple of eight.

10. The method of claim 1 wherein the generating the symbol alignment estimate includes receiving a training signal wherein all allowable tones are modulated by a two-bit constellation, quadrature amplitude modulation with the bit mapping defined according to a table.

11. A communication system for symbol synchronization, the communication system comprising:

a symbol alignment estimate generator, the symbol alignment estimate generator configured to:
  measure Discrete Fourier Transform domain complex constellation points of a pilot carrier over a block of symbols;
  compute an average of the complex constellation points over the block of symbols;
  for each symbol of the block of symbols, accumulate a Euclidean distance between the average of the complex constellation points and complex constellation points for one or more selected carriers; and
  determine a noise measurement based on the accumulated Euclidean distance.

12. The communication system of claim 11, the symbol alignment estimate generator configured to:
  monitor a signal to noise ratio (SNR) that is based at least in part on a ratio of the average of the complex constellation point and the noise measurement;
  index a symbol starting point;
  perform an indexed search for a minimum inter-symbol interference (ISI) until the search covers a full discrete multi-tone (DMT) symbol; and
  determine a point in the search associated with a maximum SNR as the symbol alignment estimate.

13. The communication system of claim 12 wherein the search uses a pilot tone and an indexing offset value such that the index spans an integer number of pilot tone periods to enable a sample timing recovery system to maintain a constant phase reference as an assumed symbol alignment point is hopped through a range of the search.

14. The communication system of claim 12 wherein the search uses features of carriers that enable simplified calculations.

15. A method for performing symbol boundary synchronization in a communication system, the method comprising:
  generating a symbol alignment estimate from a search for a minimum inter-symbol interference (ISI) based in part on:
    computing an average Discrete Fourier Transform domain complex value of constellation points over a block of symbols;
    for each symbol of the block of symbols, determining a complex error as an accumulated Euclidean distance between the average complex value and complex values of one or more constellation points associated with at least one carrier; and
    monitoring a signal to noise ratio (SNR) that is based at least in part on a ratio of the average complex value and the complex error to determine the symbol alignment estimate.

16. The method of claim 15 wherein generating the symbol alignment estimate is further based in part on:
  determining a noise measurement based in part on the complex error;
  indexing a symbol starting point based in part on an integer number of pilot tone periods;
  performing an indexed search until the search covers a full discrete multi-tone (DMT) symbol; and
  determining the symbol alignment estimate at a maximum monitored SNR.

17. The method of claim 16 wherein the noise measurement is a minimum noise variance value used as a coarse symbol alignment point after the search covers the full DMT symbol.

* * * * *